United States Patent
Yun et al.

(10) Patent No.: US 7,508,880 B2
(45) Date of Patent: Mar. 24, 2009

(54) APPARATUS AND METHOD FOR SPACE-TIME-FREQUENCY BLOCK CODING FOR INCREASING PERFORMANCE

(75) Inventors: Sung-Ryul Yun, Suwon-si (KR); Chan-Byoung Chae, Seoul (KR); Hong-Sil Jeong, Seoul (KR); Won-Il Roh, Yongin-si (KR); Dong-Seek Park, Yongin-si (KR); Jae-Yoel Kim, Suwon-si (KR); Jeong-Tae Oh, Yongin-si (KR); Kyun-Byoung Ko, Hwasung-si (KR)

(73) Assignee: Samsung Electronics Co., Ltd. (KR)

( * ) Notice: Subject to any disclaimer, the term of this patent is extended or adjusted under 35 U.S.C. 154(b) by 575 days.

(21) Appl. No.: 11/205,669

(22) Filed: Aug. 17, 2005

(65) Prior Publication Data
US 2006/0039500 A1   Feb. 23, 2006

(30) Foreign Application Priority Data
Aug. 17, 2004   (KR) ............. 10-2004-0064799
Mar. 9, 2005   (KR) ............. 10-2005-0019850

(51) Int. Cl.
*H04B 7/02*   (2006.01)
(52) U.S. Cl. .......... 375/267; 375/299; 375/341; 375/347; 375/349; 375/135; 375/146; 375/147
(58) Field of Classification Search ........ 375/267, 375/299, 341, 347, 349, 135, 136, 146, 147
See application file for complete search history.

(56) References Cited

U.S. PATENT DOCUMENTS

| 6,127,971 | A | 10/2000 | Calderbank et al. | |
| 6,317,411 | B1 | 11/2001 | Whinnett et al. | |
| 6,452,916 | B1 | 9/2002 | Hochwald et al. | |
| 2003/0067993 | A1* | 4/2003 | Viswanathan | 375/267 |
| 2003/0144033 | A1 | 7/2003 | Sumasu et al. | |
| 2004/0257978 | A1* | 12/2004 | Shao et al. | 370/208 |
| 2008/0039107 | A1* | 2/2008 | Ma et al. | 455/450 |

FOREIGN PATENT DOCUMENTS

| EP | 0 929 161 | 7/1999 |
| KR | 10-2005-0037215 | 4/2005 |
| RU | 2 190 296 | 8/1999 |
| SU | 2 007 041 | 7/1991 |
| WO | WO 99/14871 | 3/1999 |

OTHER PUBLICATIONS

Vahid Tarokh et al., "Space-Time Block Codes From Orthogonal Designs", IEEE Transactions on Information Theory, vol. 45, No. 5, Jul. 1999, pp. 1456-1467.
Siavash M. Alamouti, "A Simple Transmit Diversity Technique for Wireless Communications," IEEE Journal on Select Areas in Communications, vol. 16, No. 8, Oct. 1998, pp. 1451-1458.

* cited by examiner

*Primary Examiner*—Shuwang Liu
*Assistant Examiner*—Kabir A Timory
(74) *Attorney, Agent, or Firm*—The Farrell Law Firm, PC

(57) ABSTRACT

A space-time-frequency block coding apparatus and method in a transmitter with three transmit (Tx) antennas are provided. An input symbol sequence is transmitted through three Tx antennas according to a permutation method using a selected transmission matrix in order to improve the performance of an STFBC.

20 Claims, 7 Drawing Sheets

APPARATUS AND METHOD FOR SPACE-TIME-FREQUENCY BLOCK CODING FOR INCREASING PERFORMANCE

PRIORITY

This application claims priority under 35 U.S.C. § 119 to an application entitled "Apparatus And Method For Space-Time-Frequency Block Coding For Increasing Performance" filed in the Korean Intellectual Property Office on Aug. 17, 2004 and assigned Ser. No. 2004-64779, and "Apparatus And Method For Space-Time-Frequency Block Coding For Increasing Performance" filed in the Korean Intellectual Property Office on Mar. 9, 2005 and assigned Ser. No. 2005-19850, the contents of each of which are herein incorporated by reference.

BACKGROUND OF THE INVENTION

1. Field of the Invention

The present invention relates generally to a space-time-frequency block coding apparatus in a transmitter with three transmit (Tx) antennas, and in particular, to an apparatus for transmitting an input symbol sequence through three Tx antennas using a selected transmission matrix in order to improve the performance of a space-time-frequency block code (STFBC).

2. Description of the Related Art

The fundamental issue in communications is how efficiently and reliably data is transmitted on the channels. As future-generation multimedia mobile communications require high-speed communication systems capable of transmitting a variety of information including video and wireless data beyond the voice-focused service, it is important to increase system efficiency through the use of a channel coding method suitable for the system.

In the wireless channel environment of a mobile communication system, as opposed to a wired channel environment, a transmission signal inevitably experiences loss due to several factors such as multipath interference, shadowing, wave attenuation, time-variant noise, and fading. The information loss causes a severe distortion to the transmission signal, degrading the entire system performance. In order to reduce the information loss, many error control techniques are usually adopted to increase system reliability. One of these techniques is to use an error correction code.

Multipath fading is reduced through the use of diversity techniques in the wireless communication system. The diversity techniques are, for example, time diversity, frequency diversity, and antenna diversity.

Antenna diversity uses multiple antennas. This diversity scheme is further divided into receive (Rx) antenna diversity using a plurality of Rx antennas, Tx antenna diversity using a plurality of Tx antennas, and multiple-input multiple-output (MIMO) using a plurality of Tx antennas and a plurality of Rx antennas.

The MIMO is a special case of space-time coding (STC) that extends the coding of the time domain to the space domain by the transmission through a plurality of Tx antennas of a signal encoded according to a set coding method, with the aim to achieve a lower error rate.

V. Tarokh, et al. proposed space-time block coding (STBC) as one of the methods to efficiently applying antenna diversity (see "Space-Time Block Coding from Orthogonal Designs", IEEE Trans. On Info., Theory, Vol. 45, pp. 1456-1467, July 1999). The Tarokh STBC scheme is an extension of the transmit antenna diversity scheme of S. M. Alamouti (see, "A Simple Transmit Diversity Technique for Wireless Communications", IEEE Journal on Selected Area in Communications, Vol. 16, pp. 1451-1458, October 1988), for two or more Tx antennas.

FIG. 1 is a block diagram of a transmitter in a mobile communication system using the conventional Tarokh's STBC scheme. The transmitter is comprised of a modulator 100, a serial-to-parallel (S/P) converter 102, an STBC coder 104, and four Tx antennas 106, 108, 110 and 112.

Referring to FIG. 1, the modulator 100 modulates input information data (or coded data) according to a modulation scheme. The modulation scheme can be one of binary phase shift keying (BPSK), quadrature phase shift keying (QPSK), quadrature amplitude modulation (QAM), pulse amplitude modulation (PAM), and phase shift keying (PSK).

The S/P converter 102 parallelizes serial modulation symbols received from the modulator 100, $s_1$, $s_2$, $s_3$, $s_4$. The STBC coder 104 creates eight symbol combinations by STBC-encoding the four modulation symbols, $s_1$, $s_2$, $s_3$, $s_4$ and sequentially transmits them through the four Tx antennas 106 to 112. A coding matrix used to generate the eight symbol combinations is expressed as $$G_4 = \begin{bmatrix} s_1 & s_2 & s_3 & s_4 \\ -s_2 & s_1 & -s_4 & s_3 \\ -s_3 & s_4 & s_1 & -s_2 \\ -s_4 & -s_3 & s_2 & s_1 \\ s_1^* & s_2^* & s_3^* & s_4^* \\ -s_2^* & s_1^* & -s_4^* & s_3^* \\ -s_3^* & s_4^* & s_1^* & -s_2^* \\ -s_4^* & -s_3^* & s_2^* & s_1^* \end{bmatrix} \quad (1)$$

where $G_4$ denotes the coding matrix for symbols transmitted through the four Tx antennas 106 to 112 and $s_1$, $s_2$, $s_3$, $s_4$ denote the input four symbols to be transmitted. The number of columns of the coding matrix is equal to the number of Tx antennas, and the number of rows corresponds to the time required to transmit the four symbols. Thus, the four symbols are transmitted through the four Tx antennas over eight time intervals.

Specifically, for a first time interval, $s_1$ is transmitted through the first Tx antenna 106, $s_2$ through the second Tx antenna 108, $s_3$ through the third Tx antenna 110, and $s_4$ through the fourth Tx antenna 112. In this manner, $-s_4^*$, $-s_3^*$, $s_2^*$, $-s_1^*$ are transmitted through the first to fourth Tx antennas 106 to 112, respectively, during an eighth time interval. That is, the STBC coder 104 sequentially provides the symbols of an $i^{th}$ column in the coding matrix to an $i^{th}$ Tx antenna.

As described above, the STBC coder 104 generates the eight symbol sequences using the four input symbols and their conjugates and negatives, and transmits them through the four Tx antennas 106 to 112 over eight time intervals. Since the symbol sequences for the respective Tx antennas, that is the columns of the coding matrix, are mutually orthogonal, a diversity gain equal to the diversity order can be achieved.

FIG. 2 is a block diagram of a receiver in the mobile communication system using the conventional STBC scheme. The receiver is the counterpart of the transmitter illustrated in FIG. 1.

The receiver is comprised of a plurality of Rx antennas 200 to 202, a channel estimator 204, a signal combiner 206, a detector 208, a parallel-to-serial (P/S) converter 210, and a demodulator 212.

Referring to FIG. 2, the first to $P^{th}$ Rx antennas 200 to 202 provide signals received from the four Tx antennas of the transmitter illustrated in FIG. 1 to the channel estimator 204 and the signal combiner 206. The channel estimator 204 estimates channel coefficients representing channel gains from the Tx antennas 106 to 112 to the Rx antennas 200 to 202 using the signals received from the first to $P^{th}$ Rx antennas 200 to 202. The signal combiner 206 combines the signals received from the first to $p^{th}$ Rx antennas 200 to 202 with the channel coefficients in a predetermined method. The detector 208 generates hypothesis symbols by multiplying the combined symbols by the channel coefficients, calculates decision statistics for all possible symbols transmitted from the transmitter using the hypothesis symbols, and detects the actual transmitted symbols through threshold detection. The P/S converter 210 serializes the parallel symbols received from the detector 208. The demodulator 212 demodulates the serial symbol sequence in a according to a demodulation method, thereby recovering the original information bits.

As stated earlier, the Alamouti STBC technique offers the benefit of achieving a diversity order equal to the number of Tx antennas, namely a full diversity order, without sacrificing the data rate by transmitting complex symbols through two Tx antennas only.

The Tarokh STBC scheme extended from the Alamouti STBC scheme achieves a full diversity order using an STBC in the form of a matrix with orthogonal columns, as described with reference to FIGS. 1 and 2. However, because four complex symbols are transmitted over eight time intervals, the Tarokh STBC scheme causes a half decrease in the data rate. In addition, since it takes eight time intervals to completely transmit one block with four complex symbols, reception performance is degraded due to channel changes within the block over a fast fading channel. In other words, the transmission of complex symbols through four or more Tx antennas requires 2N time intervals for N symbols, causing a longer latency and a decrease in the data rate.

To achieve a full rate in a MIMO system that transmits a complex signal through three or more Tx antennas, the Giannakis group presented a full-diversity, full-rate (FDFR) STBC for four Tx antennas using constellation rotation over a complex field.

FIG. 3 is a block diagram of a transmitter in a mobile communication system using the conventional Giannakis STBC scheme. As illustrated in FIG. 3, the transmitter includes a modulator 300, a pre-coder 302, a space-time mapper 304, and a plurality of Tx antennas 306, 308, 310 and 312.

Referring to FIG. 3, the modulator 300 modulates input information data (or coded data) according to a modulation scheme such as BPSK, QPSK, QAM, PAM or PSK. The pre-coder 302 pre-encodes Nt modulation symbols received from the modulator 300, $d_1, d_2, d_3, d_4$, such that signal rotation occurs in a signal space, and outputs the resulting Nt symbols. For notational simplicity, four Tx antennas are assumed. Let a sequence of four modulation symbols from the modulator 300 be denoted by d. The pre-coder 302 generates a complex vector r by computing the modulation symbol sequence, d using Equation (2).

$$r = \Theta d = \begin{bmatrix} 1 & \alpha_0^1 & \alpha_0^2 & \alpha_0^3 \\ 1 & \alpha_1^1 & \alpha_1^2 & \alpha_1^3 \\ 1 & \alpha_2^1 & \alpha_2^2 & \alpha_2^3 \\ 1 & \alpha_3^1 & \alpha_3^2 & \alpha_3^3 \end{bmatrix} \begin{bmatrix} d_1 \\ d_2 \\ d_3 \\ d_4 \end{bmatrix} = \begin{bmatrix} r_1 \\ r_2 \\ r_3 \\ r_4 \end{bmatrix} \quad (2)$$

where $\Theta$ denotes a pre-coding matrix. The Giannakis group uses a unitary Vandermonde matrix as the pre-coding matrix. In the pre-coding matrix, $\alpha_i$ is given as $$\alpha_i = \exp(j2\pi(i+1/4)/4), i=0,1,2,3 \quad (3)$$

The Giannakis STBC scheme uses four Tx antennas and is easily extended to more than four Tx antennas. The space-time mapper 304 STBC-encodes the pre-coded symbols according to the following method.

$$S = \begin{bmatrix} r_1 & 0 & 0 & 0 \\ 0 & r_2 & 0 & 0 \\ 0 & 0 & r_3 & 0 \\ 0 & 0 & 0 & r_4 \end{bmatrix} \quad (4)$$

where S is a coding matrix for symbols transmitted through the four Tx antennas 306 to 312. The number of columns of the coding matrix is equal to the number of Tx antennas, and the number of the rows corresponds to the time required to transmit the four symbols. That is, the four symbols are transmitted through the four Tx antennas over the four time intervals.

Specifically, for a first time interval, $r_1$ is transmitted through the first Tx antenna 306, with no signals through the other Tx antennas 308, 310 and 312. For a second time interval, $r_2$ is transmitted through the second Tx antenna 308, with no signals through the other Tx antennas 306, 310 and 312. For a third time interval, $r_3$ is transmitted through the third Tx antenna 310, with no signals through the other Tx antennas 306, 308, and 312. For a fourth time interval, $r_4$ is transmitted through the fourth Tx antenna 310, with no signals through the other Tx antennas 306, 308 and 310.

Upon receipt of the four symbols on a radio channel for the four time intervals, a receiver (not shown) recovers the modulation symbol sequence, d, by using maximum likelihood (ML) decoding.

Tae-Jin Jung and Kyung-Whoon Cheun proposed a precoder and a concatenated code with an excellent coding gain in 2003, compared to the Giannakis STBC. They enhance the coding gain by concatenating Alamouti STBCs instead of using a diagonal matrix proposed by the Giannakis group. For the sake of convenience, this STBC will be referred to as the "Alamouti FDFR STBC".

FIG. 4 is a block diagram of a transmitter in a mobile communication system using the conventional Alamouti FDFR STBC and four Tx antennas. As illustrated in FIG. 4, the transmitter includes a pre-coder 400, a mapper 402, a delay 404, two Alamouti coders 406 and 408, and four Tx antennas 410, 412, 414 and 416.

Referring to FIG. 4, the pre-coder 400 pre-encodes four input modulation symbols, $d_1, d_2, d_3, d_4$, such that signal rotation occurs in a signal space. For the input of a sequence of the four modulation symbols, d, the pre-coder 400 generates a complex vector, r, by computing $$r = \Theta d = \begin{bmatrix} 1 & \alpha_0^1 & \alpha_0^2 & \alpha_0^3 \\ 1 & \alpha_1^1 & \alpha_1^2 & \alpha_1^3 \\ 1 & \alpha_2^1 & \alpha_2^2 & \alpha_2^3 \\ 1 & \alpha_3^1 & \alpha_3^2 & \alpha_3^3 \end{bmatrix} \begin{bmatrix} d_1 \\ d_2 \\ d_3 \\ d_4 \end{bmatrix} = \begin{bmatrix} r_1 \\ r_2 \\ r_3 \\ r_4 \end{bmatrix} \quad (5)$$

where $\alpha_i = \exp(j2\pi(i+1/4)/4)$, $i=0,1,2,3$.

The mapper 402 groups the four pre-coded symbols by twos and outputs two vectors each including two elements, $[r_1, r_2]^T$ and $[r_3, r_4]^T$ to the Alamouti coder 406 and the delay 404, respectively. The delay 404 delays the second vector $[r_3, r_4]^T$ for one time interval. Thus, the first vector $[r_1, r_2]^T$ is provided to the Alamouti coder 406 in a first time interval and the second vector $[r_3, r_4]^T$ is provided to the Alamouti coder 408 in a second time interval. The Alamouti coder refers to a coder that operates in the Alamouti STBC scheme. The Alamouti coder 406 encodes $[r_1, r_2]^T$ so that it is transmitted through the first and second Tx antennas 410 and 412 during the first and second time intervals. The Alamouti coder 408 encodes $[r_3, r_4]^T$ so that it is transmitted through the third and fourth Tx antennas 414 and 416 during the third and fourth time intervals. A coding matrix used to transmit the four symbols from the mapper 402 through the multiple antennas is $$S = \begin{bmatrix} r_1 & r_2 & 0 & 0 \\ -r_2^* & r_1^* & 0 & 0 \\ 0 & 0 & r_3 & r_4 \\ 0 & 0 & -r_4^* & r_3^* \end{bmatrix} \quad (6)$$

Unlike the coding matrix illustrated in Equation (4), the above coding matrix is designed to be an Alamouti STBC rather than a diagonal matrix. The use of the Alamouti STBC scheme increases the coding gain.

This Alamouti FDFR STBC, however, has the distinctive shortcoming of increased coding complexity because the transmitter needs to perform computations between all of the elements of the pre-coding matrix and an input vector, for pre-coding. For example, for four Tx antennas, since 0 is not included in the elements of the pre-coding matrix, computation must be carried out on 16 elements. Also, the receiver needs to perform ML decoding with a large volume of computation in order to decode the signal, d, transmitted by the transmitter.

To reduce such high complexity, Chan-Byoung Chae, et al. of Samsung Electronics proposed a novel STBC, $$\Theta = \begin{bmatrix} 1 & \alpha_0^1 & \ldots & \alpha_0^{N_t/2-1} & 0 & \ldots & 0 \\ 0 & 0 & \ldots & 0 & 1 & \ldots & \alpha_1^{N_t/2-1} \\ \vdots & \vdots & \ddots & \ldots & \ldots & \ddots & \vdots \\ 1 & \alpha_{N_t-2}^1 & \ldots & \alpha_{N_t-2}^{N_t/2-1} & 0 & \ldots & 0 \\ 0 & 0 & \ldots & 0 & 1 & \ldots & \alpha_{N_t-1}^{N_t/2-1} \end{bmatrix} \quad (7)$$

where $\Theta$ is a pre-coding matrix for an arbitrary even number of Tx antennas. The subsequent operations are performed in the same manner as in Cheun's group. Yet, compared to the FDFR Alamouti STBC scheme, Chae's scheme remarkably reduces the ML decoding complexity at the receiver through a series of operations, that is, puncturing and shifting.

However, all of the approaches described above suffer from high decoding complexity relative to the Alamouti scheme that allows linear decoding of the transmitted symbols, and thus continual efforts have been made to further decrease the decoding complexity. In this context, Professor Sundar Rajan's group from India (hereinafter, referred to as Sundar Rajan group) presented an FDFR STBC that allows linear decoding.

For the Sundar Rajan group's STBC, every value $r_i$ of the coding matrix illustrated in Equation (6) is multiplied by $e^{j\theta}$ (i.e. rotation on a complex plane), and the real and imaginary parts of the resulting new value $x_i + jy_i$ are reconstructed. The coding matrix produced in this way is expressed as $$S = \begin{bmatrix} x_1 + jy_3 & x_2 + jy_4 & 0 & 0 \\ -(x_2 + jy_4)^* & (x_1 + jy_3)^* & 0 & 0 \\ 0 & 0 & x_3 + jy_1 & x_4 + jy_2 \\ 0 & 0 & -(x_4 + jy_2)^* & (x_3 + jy_1)^* \end{bmatrix} \quad (8)$$

The use of Equation (8) allows for linear decoding at the receiver, thus decreasing the decoding complexity. Professor Sundar Rajan uses a fixed phase rotation angle $\theta$. Here, $\theta = (1/2) a \tan 2$.

A mobile communication system using the Sundar Rajan group's STBC scheme adopts a transmitter having the configuration illustrated in FIG. 5. Information symbols $s_1, s_2, s_3, s_4$ are multiplied by $\exp(j\theta)$ in a pre-coder 500 and then reconstructed in a mapper 502.

To be more specific, the mapper 502 reconstructs pre-coded symbols $c_i = x_i + jy_i$ to $c_1' = x_1 + jy_3$, $c_2' = x_2 + jy_4$, $c_3' = x_3 + jy_1$, and $c_4' = x_4 + jy_2$, and groups the reconstructed symbols in pairs to vectors $[c_2'c_1']$ and $[c_4'c_3']$. The vectors $[c_2'c_1']$ and $[c_4'c_3']$ are transmitted through their corresponding Alamouti coders 506 and 508. Delay 504 is used to delay the $[C_4'C_3']$ vector.

To illustrate that the performance of the Sundar Rajan group's STBC can be further improved, a brief survey of an orthonormal space-time code and orthogonal space-time code will be given below.

To demodulate an orthonormal space-time code S proposed by Tarokh et. al., S is multiplied by its Hermitian, $S^H$. Thus, $$SS^H = \begin{bmatrix} \rho & 0 & 0 & 0 \\ 0 & \rho & 0 & 0 \\ 0 & 0 & \rho & 0 \\ 0 & 0 & 0 & \rho \end{bmatrix} \quad (9)$$

where $\rho$ is a constant. If a space-time code satisfies Equation (9), it was found out that an available full rate is $$R_{max} = \frac{a+1}{2^a} \quad (10)$$

The number of Tx antennas $N = 2^a$. Therefore, for a system with four Tx antennas, $a=2$ and $R_{max}=3/4$.

The Sundar Rajan group proved that its orthogonal space-time code also achieves full diversity. In this case, $$SS^H = \begin{bmatrix} \rho_1 & 0 & 0 & 0 \\ 0 & \rho_1 & 0 & 0 \\ 0 & 0 & \rho_2 & 0 \\ 0 & 0 & 0 & \rho_2 \end{bmatrix} \quad (11)$$

where $\rho_1=|h_1|^2+|h_2|^2$ and $\rho_2=|h_3|^2+|h_4|^2$ (h is a channel coefficient). One thing to be noted here is that this orthogonal space-time code leads to the rate of $$R_{max} = \frac{2a}{2^a} \quad (12)$$

This equation reveals that $R_{max}=1$ can be achieved for a system with four Tx antennas because $N=2^a$. That is, the use of an orthogonal space-time code achieves full diversity and full rate.

Although it is theoretically impossible to design an FDFR orthogonal space-time code, it can be considered to be the upper bound of performance. This can be confirmed from the performance of a 1Rx 4Rx system. In this system, the orthogonal space-time code performs poorly, which implies that there is more room for improving the performance of the orthogonal space-time code.

To achieve full diversity and full rate in an Orthogonal Frequency Division Multiplexing (OFDM) system with three Tx antennas, the Sundar Rajan group proposed the following.

$$A = \begin{bmatrix} s_1 & -s_2^* & 0 & 0 \\ s_2 & s_1^* & s_3 & -s_4^* \\ 0 & 0 & s_4 & s_3^* \end{bmatrix} \quad (13)$$

The above coding matrix A involves frequency and time as variables for the communication system with three Tx antennas. The rows of the coding matrix A represent the respective Tx antennas. The first two columns ($s_i$ and $-s^*_2$; in the first row) are mapped to a first frequency and the last two columns (0 and 0 in the first row) to a second frequency. The former column in each of the two column pairs ($s_1$ in the first row) is mapped to a first time interval and the latter column ($-s^*_2$; in the first row) to a second time interval. Therefore, the symbol transmitted at the second time interval at the second frequency through the second antenna is $s^*_1$ and the symbol transmitted at the first time interval at the second frequency through the third antenna is $s_4$.

SUMMARY OF THE INVENTION

For more accurate communications, however, a need exists for improving the performance of the above described STFC.

An object of the present invention is to substantially solve at least the above problems and/or disadvantages and to provide at least the advantages below. Accordingly, an object of the present invention is to provide a space-time-frequency block coding apparatus and method for improving performance in a mobile communication system with three Tx antennas.

Another object of the present invention is to provide a space-time-frequency block coding apparatus and method for improving performance in a mobile communication system with three Tx antennas where vector symbols are rotated on a complex plane and the real and imaginary parts of the resulting new symbols $x_i+jy_i$ are reconstructed, prior to transmission.

A further object of the present invention is to provide an apparatus a space-time-frequency block coding apparatus and method for improving performance by selecting a transmission matrix in a mobile communication system using multiple antennas where vector symbols are rotated on a complex plane and the real and imaginary parts of the resulting new symbols $x_i+jy_i$ are reconstructed, prior to transmission.

The above objects are achieved by providing a space-time-frequency block coding apparatus and method in a communication system with three Tx antennas.

According to one aspect of the present invention, in a transmitter with three transmit antennas in a communication system using a space-time-frequency block coding scheme, a pre-coder pre-codes a symbol vector of an input symbol sequence by multiplying the symbol vector by $e^{j\theta}$ and outputs pre-coded symbols. $\theta$ is a phase rotation angle. An STFBC mapper selects an STFBC using a combination matrix in which the matrices A, B and C are arranged in an arbitrary order, maps the pre-coded symbols to the transmit antennas according to the selected STFBC, and transmits the mapped symbols through the transmit antennas.

According to another aspect of the present invention, in a transmitter with three transmit antennas in a communication system using a space-time-frequency block coding scheme, a pre-coder pre-codes a symbol vector of an input symbol sequence by multiplying the symbol vector by $e^{j\theta}$ and outputs pre-coded symbols. $\theta$ is a phase rotation angle. An STFBC mapper selects an STFBC using a combination matrix calculated, maps the pre-coded symbols to the transmit antennas according to the selected STFBC, and transmits the mapped symbols through the transmit antennas.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention is intended to provide a space-time-frequency block coding scheme for improving performance in a system using an FDFR orthogonal STFBC.

Figure 1:
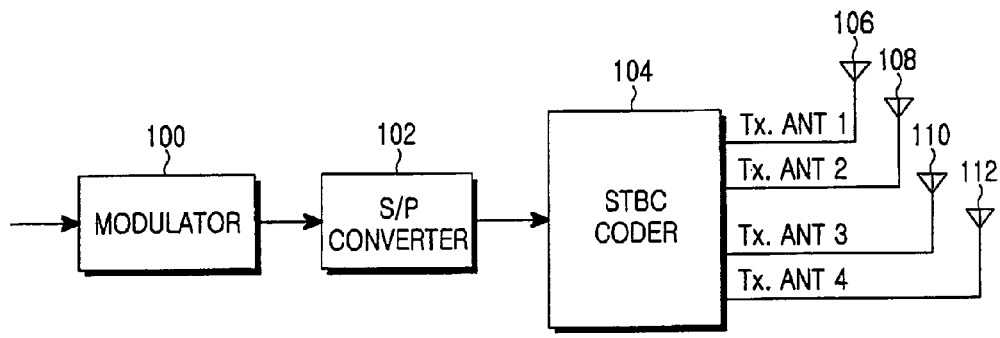
FIG. 1 is a block diagram of a transmitter in a mobile communication system using a conventional STBC scheme.
Figure 2:
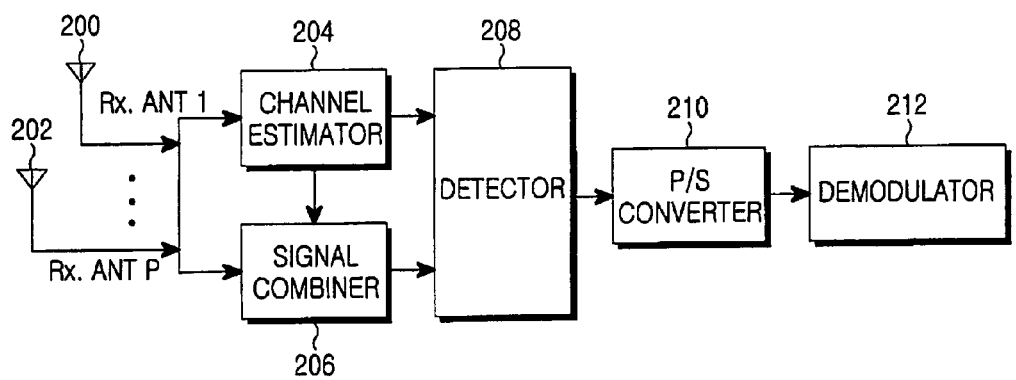
FIG. 2 is a block diagram of a receiver in the mobile communication system using the conventional STBC scheme.
Figure 3:
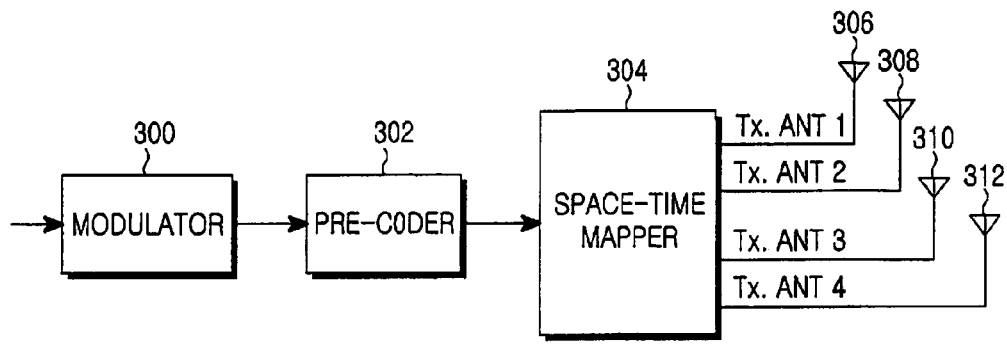
FIG. 3 is a block diagram of a transmitter in a mobile communication system using a conventional Giannakis STBC scheme.
Figure 4:
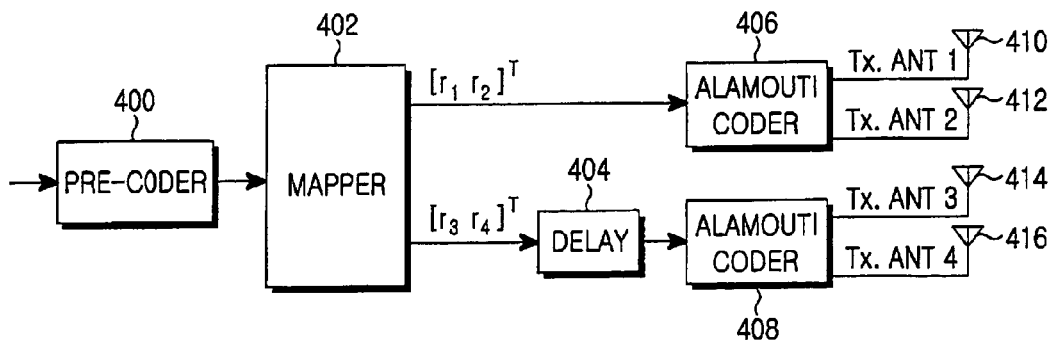
FIG. 4 is a block diagram of a transmitter in a mobile communication system using a conventional Alamouti FDFR STBC scheme with four Tx antennas proposed by Tae-Jin Jung and Kyung-Whoon Cheun.
Figure 5:
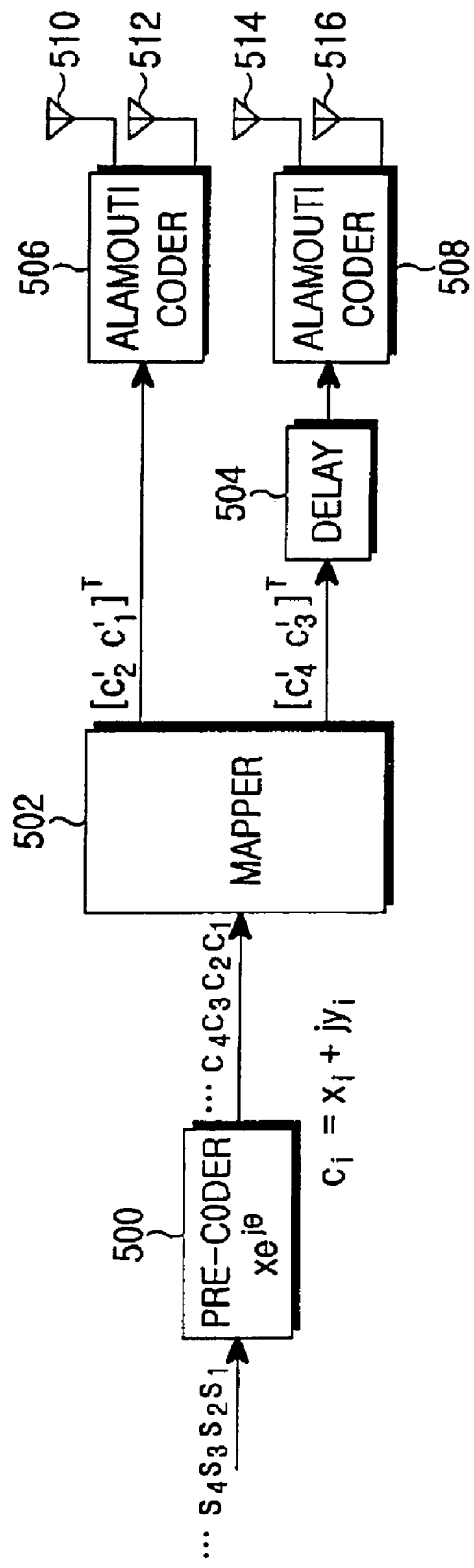
FIG. 5 is a block diagram of a transmitter in a mobile communication system using a Sundar Rajan group's STBC scheme.
Figure 6:
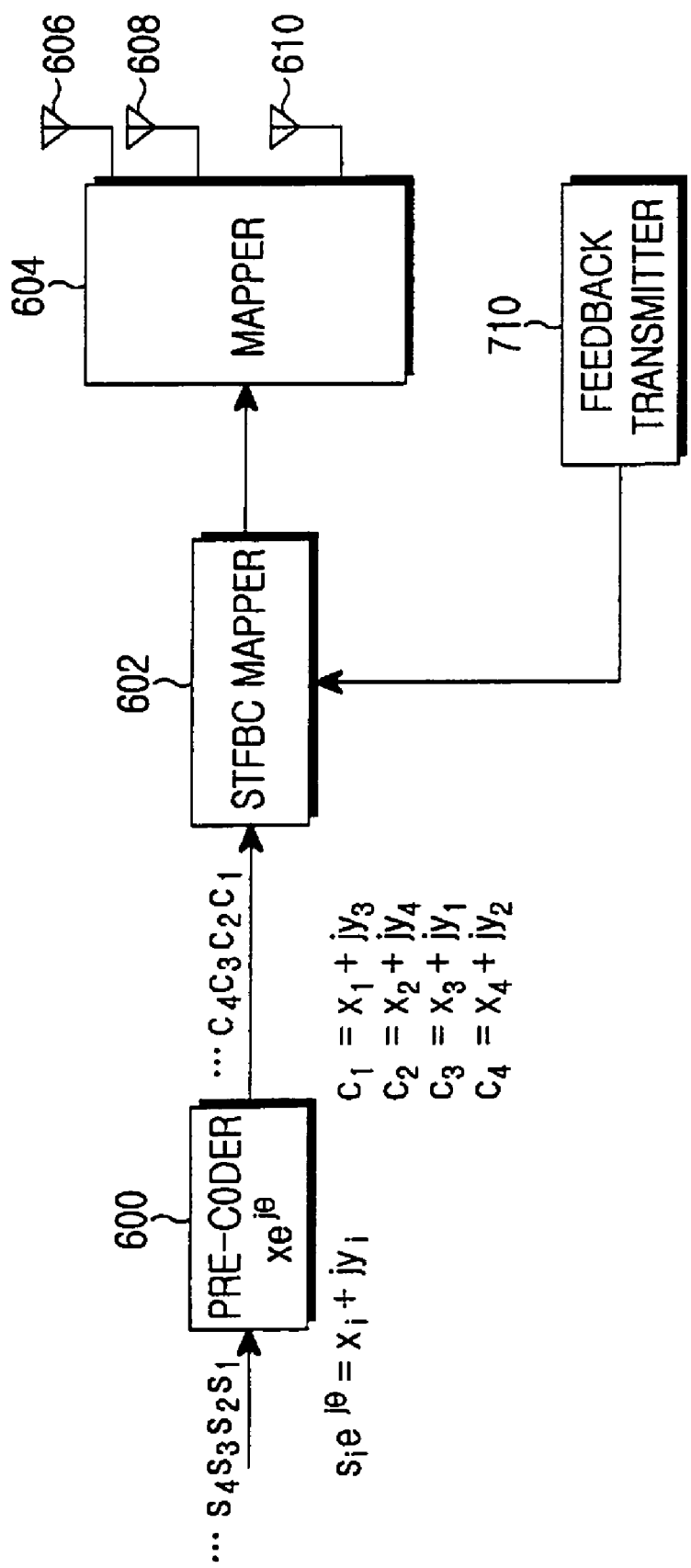
FIG. 6 is a block diagram of a transmitter in a mobile communication system using an STFBC scheme using feedback information from a receiver.

FIG. 6 is a block diagram of a transmitter in a mobile communication system using an STFBC scheme using feedback information from a receiver. This embodiment is explained as an example having very similar effect corresponding to the present invention. Here, it is assumed that the transmitter uses three Tx antennas.

Referring to FIG. 6, a pre-coder 600 multiplies each of the input information symbols $s_1, s_2, s_3, s_4$ by $e^{j\theta}$, that is rotates $s_1, s_2, s_3, s_4$ on a complex plane by $\theta$, resulting in new symbols $c_1, c_2, c_3, c_4$ expressed as $x_i + jy_i$. An STFBC mapper 602 groups the symbols $c_1, c_2, c_3, c_4$ by selecting an STFBC based on feedback channel information from a receiver, or based on an STFBC index calculated at the receiver. A mapper 604 maps the grouped symbols to Tx antennas 606, 608 and 610, for transmission. The STFBC mapper 602 and the mapper 604 can be incorporated into a single device.

Figure 7:
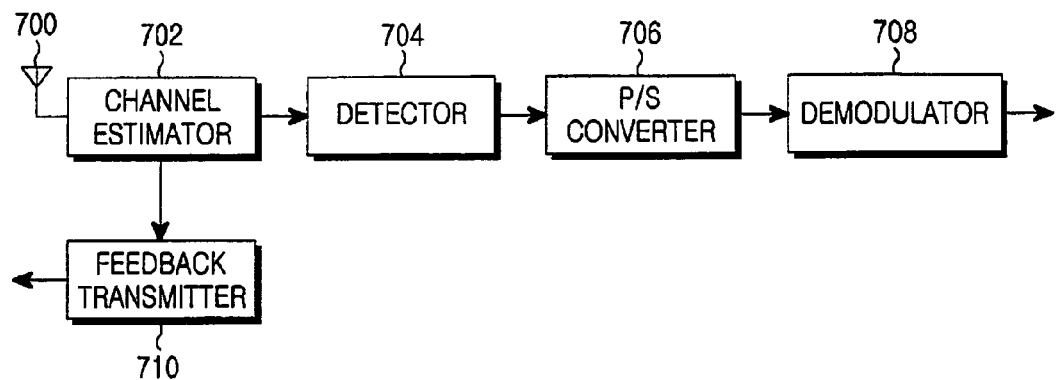
FIG. 7 is a block diagram of a receiver in the mobile communication system using the STFBC scheme corresponding to the transmitter in FIG. 6.

FIG. 7 is a block diagram of a receiver in the mobile communication system using the STFBC scheme corresponding to the transmitter in FIG. 6. For notational simplicity, the receiver is assumed to have one Rx antenna.

Referring to FIG. 7, a channel estimator 702 performs channel estimation on a signal received through an RX antenna 700. After the channel estimation, the received signal is decoded according to a decoding method. A feedback transmitter 710 transmits channel quality indicators (CQIs) received from the channel estimator 702 to the STFBC mapper 602 of the transmitter. Alternatively, the receiver calculates an STFBC index and transmits it to the transmitter through the feedback transmitter 710. The operation of the feedback transmitter 710 will be detailed below.

In accordance with the present invention, the receiver feeds back the CQIs of all of the channels to the transmitter or transmits an STFBC index to the transmitter for use in the STFBC mapper.

1) Feedback of All Channel Information

Upon receipt of the channel coefficients estimated at the receiver, the STFBC mapper 602 computes the following:

$$\text{select max (CQI\_ant1, CQI\_ant2, CQI\_ant3)} \quad (14)$$

where CQI_ant1, CQI_ant2, and CQI_ant3 represents CQIs for the first, second and third Tx antennas, respectively.

2) Transmission of STFBC Index

It is not practical for the receiver to feed back the CQIs of all of the received channels to the transmitter. Therefore, the receiver feeds back an STFBC index computed by Equation (14) to the STFBC mapper 602 of the transmitter.

Figure 8:
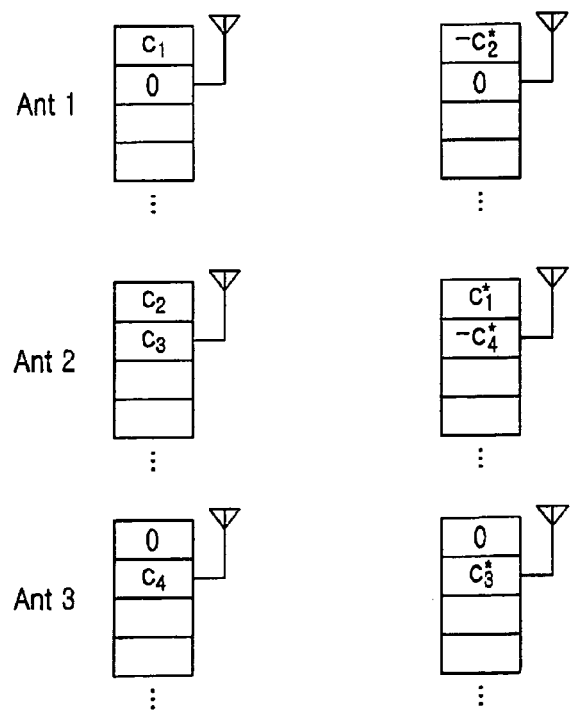
FIG. 8 illustrates the operation of an STFBC mapper illustrated in FIG. 6.

With reference to FIG. 8, a description will now be made of the operation of the STFBC mapper 602. FIG. 8 describes an STFBC for three Tx antennas. Since three Tx antennas are used, the following three STFBCs are available:

$$A = \begin{bmatrix} s_1 & -s_2^* & 0 & 0 \\ s_2 & s_1^* & s_3 & -s_4^* \\ 0 & 0 & s_4 & s_3^* \end{bmatrix} \quad (15)$$

$$B = \begin{bmatrix} s_1 & -s_2^* & s_3 & -s_4^* \\ s_2 & s_1^* & 0 & 0 \\ 0 & 0 & s_4 & s_3^* \end{bmatrix}$$

$$C = \begin{bmatrix} s_1 & -s_2^* & 0 & 0 \\ 0 & 0 & s_3 & -s_4^* \\ s_2 & s_1^* & s_4 & s_3^* \end{bmatrix}$$

In this case, a row represents the symbols for a corresponding antenna and a column represents symbols mapped with a subcarrier.

In the illustrated case, STFBC mapping is performed in the context of the matrix A. Pre-coded symbols $c_1, c_2, c_3, c_4$ are mapped according to the matrix A. In FIG. 8, s in the matrix A corresponds to c. The STFBC mapper 602 maps the symbols to the Tx antennas using one of matrices A, B and C. In the present invention, one of the matrices A, B and C that offers the optimum performance is selected based on feedback information received from the feedback transmitter 710 of the receiver. If the first antenna is in the best channel condition, the matrix B is selected to transmit more symbols through the first antenna. If the second antenna is in the best channel condition, the matrix A is selected to transmit more symbols through the second antenna. If the third antenna is in the best channel condition, the matrix C is selected to transmit more symbols through the third antenna. The adaptive matrix selection can be expressed as if CQI_ant1=select max(CQI_ant1, CQI_ant2, CQI_ant3) use Matrix B if CQI_ant2=select max(CQI_ant1, CQI_ant2, CQI_ant3) use Matrix A if CQI_ant3=select max(CQI_ant1, CQI_ant2, CQI_ant3) use Matrix C  (16)

Figure 9:
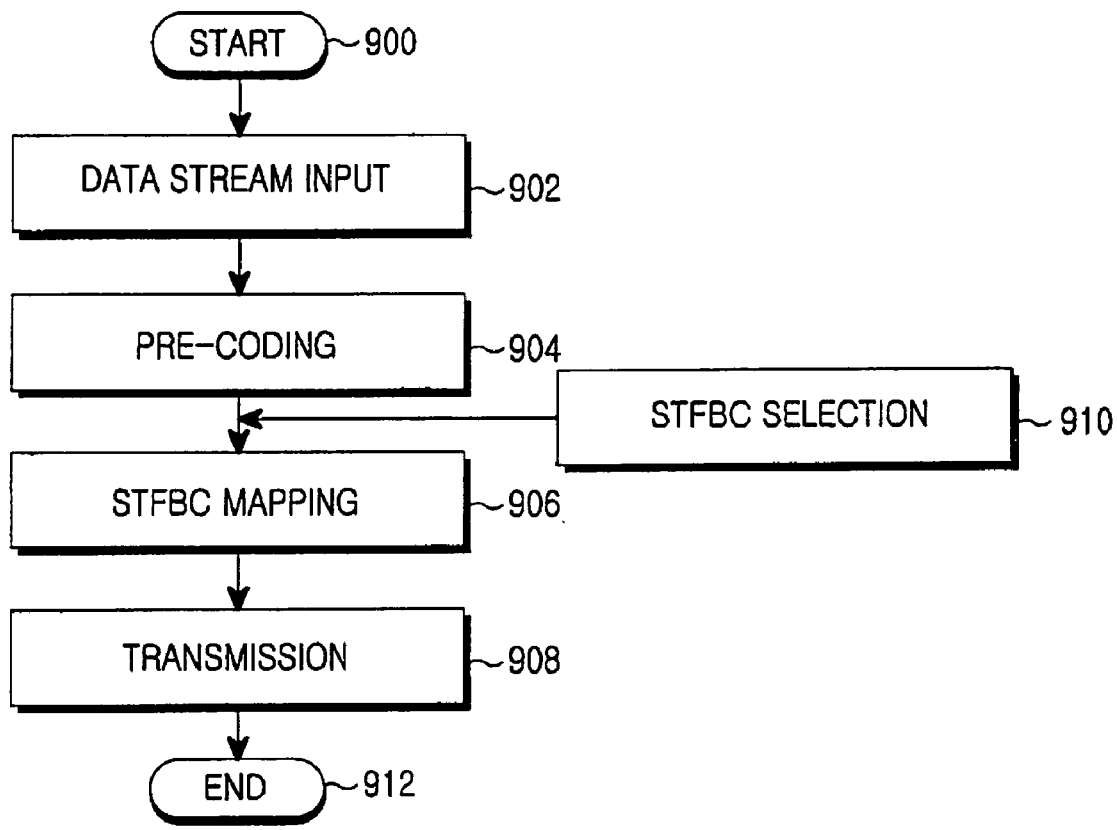
FIG. 9 is a flowchart illustrating the transmission operation of the transmitter in the mobile communication system using the STFBC scheme according to the present invention.

FIG. 9 is a flowchart illustrating the transmission operation of the transmitter in the mobile communication system using the STFBC scheme according to the present invention.

Referring to FIG. 9, upon receipt of a data stream $s_1, s_2, s_3, s_4$ in step 902, the pre-coder pre-codes the data stream in step 904. That is, the pre-coder multiplies the data stream $s_1, s_2, s_3, s_4$ by $\exp(j\theta)$, reconstructs the resulting symbols, and outputs the pre-coded symbols $c_1, c_2, c_3, c_4$ ($c_1 = x_1 + jy_3$, $c_2 = x_2 + jy_4$, $c_3 = x_3 + jy_1$, and $c_4 = x_4 + jy_2$). The transmitter selects an STFBC from the combination matrix according to a permutation method in step 910. The STFBC mapper maps the pre-coded symbols according to the selected STFBC in step 906 and transmits the mapped symbols through their corresponding Tx antennas in step 908.

Here, the transmitter groups the Tx antennas according to a predetermined rule without using the feedback information from the receiver. The antenna group may be expressed as a permutation(combination) matrix of matrixes in Equation (15).

As an example, the antenna group can be expressed as $$D = \begin{bmatrix} s_1 & -s_2^* & 0 & 0 & s_5 & -s_6^* & s_7 & -s_8^* & s_9 & -s_{10}^* & 0 & 0 \\ s_2 & s_1^* & s_3 & -s_4^* & s_6 & s_5^* & 0 & 0 & 0 & 0 & s_{11} & -s_{12}^* \\ 0 & 0 & s_4 & s_3^* & 0 & 0 & s_8 & s_7^* & s_{10} & s_9^* & s_{12} & -s_{11}^* \end{bmatrix} \quad (17)$$

The above matrix D is a permutation(combination) of the matrices illustrated in Equation (15), [A|B|C]. It is defined by the order of the matrices which can be freely set. Therefore, the following matrices D are available:

D=[A|B|C], D=[A|C|B], D=[B|A|C], D=[B|C|A], D=[C|A|B], and D=[C|B|A].

In the matrix D, the rows represent Tx antennas like the matrix A in Equation (13). The columns are grouped sequentially in pairs. Thus, the first and second columns are mapped to a first subcarrier, the third and fourth columns to a second subcarrier, and the remaining columns to third to sixth subcarriers in this manner. The first and second symbols in each column pair are mapped to a subcarrier and represent first and second symbol times, respectively.

Let the matrices A, B and C be denoted by $A_1$, $A_2$ and $A_3$, respectively. In the OFDMA communication system, the order of subcarriers is then permuted by $$A_k : k = \mathrm{mod}(\mathrm{floor}((N_c-1)/2),3)+1 \quad (18)$$

where $N_c$ is the index of a logical data subcarrier. $N_c = \{1, 2, 3, \ldots,$ the total number of subcarriers$\}$. The logical data subcarrier index refers to a subcarrier index of Fast Fourier Transform (FFT) in OFDM. According to Equation (18), logical data subcarriers with indexes 1 and 2 are mapped to the Tx antennas in the antenna grouping pattern of $A_1$, logical data subcarriers with indexes 3 and 4 are mapped to the Tx antennas in the antenna grouping pattern of $A_2$, and logical data subcarriers with indexes 5 and 6 are mapped to the Tx antennas in the antenna grouping pattern of $A_3$. In this way, the antenna grouping patterns for the remaining subcarriers are determined by Equation (18).

In summary, the permutation matrix is given by Equation (18) where $A_k$ ($A_1$=A, $A_2$=B, $A_3$=C) is an antenna grouping pattern for subcarriers, index of logical data subcarrier ranges from 1 to the total number of subcarriers.

Figure 10:
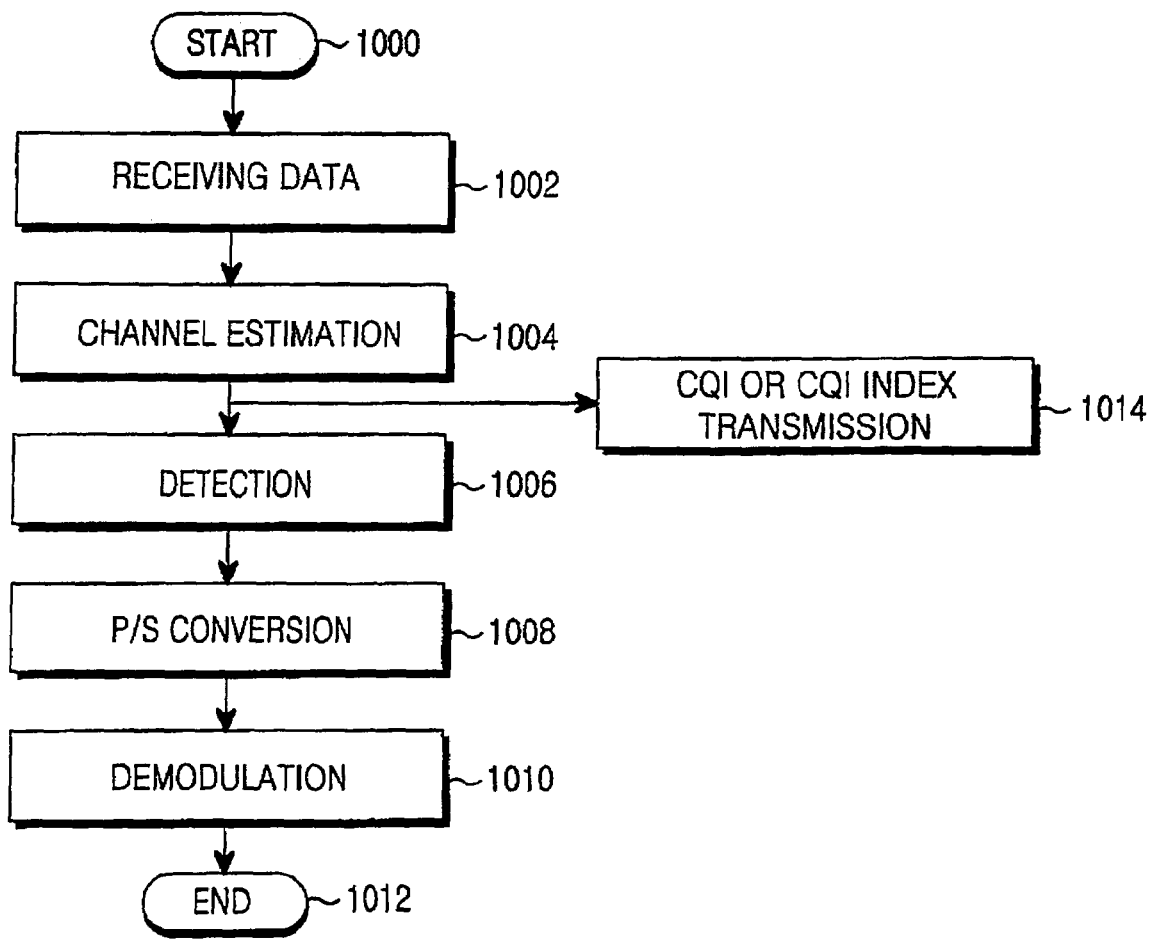
FIG. 10 is a flowchart illustrating the reception operation of the receiver in the mobile communication system using the STFBC scheme.

FIG. 10 is a flowchart illustrating the reception operation of the receiver in the mobile communication system using the STFBC scheme in FIG. 7.

Referring to FIG. 10, upon receipt of a data stream from the transmitter in step 1002, the data stream is channel-estimated in step 1004 and CQIs are transmitted as channel information to the transmitter in step 1014. In this case, the transmitter calculates an STTBC to be used by Equation (16). Alternatively, the receiver calculates an STFBC code by Equation (16) rather than transmitting the channel coefficients to the transmitter and transmits its index to the transmitter, if this is preset in the system.

In the case of direct feedback of the channel information, the transmitter notifies the receiver of the index of an STFBC selected by the transmitter in order to increase communication accuracy. In case the transmitter's selected STFBC is different from the receiver's, the transmission of the index of the transmitter's selected STTBC on a common channel to the receiver renders data transmission between them more accurate.

Thereafter, detection in step 1006, P/S conversion in step 1008, and demodulation in step 1010 are carried out in the same manner as in existing systems.

For a better understanding of the present invention, a real system will be taken as an example. In an Orthogonal Frequency Division Multiple Access (OFDMA) system based on the IEEE 802.16 standard, the receiver calculates the average channel value of every subchannel including N subcarriers in order to reduce the amount of feedback information. The transmitter selects an STFBC based on the average channel values of the subchannels. The transmitter then notifies the receiver of the selected STFBC. This bidirectional communication ensures communication accuracy.

As described above, in a space-time-frequency block coding apparatus for transmitting an input symbol sequence through a plurality of Tx antennas according to a set method in a transmitter of a communication system according to the present invention, a suitable transmission matrix having regularities is selected based on feedback channel information received from a receiver or according to an STFBC calculated at the transmitter, thereby increasing STFBC performance.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A transmitter with three transmit antennas in a communication system using a space-time-frequency block coding scheme, the transmitter comprising:

a pre-coder for pre-coding a symbol vector of an input symbol sequence by multiplying the symbol vector by $e^{j\theta}$, $\theta$ being a phase rotation angle, reconstructing the symbol vector multiplied with $e^{j\theta}$ and outputting pre-coded symbols $c_1$, $c_2$, $c_3$, and $c_4$, given as, $$c_1 = x_1 + jy_3$$

$$c_2 = x_2 + jy_4$$

$$c_3 = x_3 + jy_1$$

$$c_4 = x_4 + jy_2$$

where $c_k$ represents a $k^{th}$ pre-coded symbol, $x_k$ represents a real term of $k^{th}$ symbol within the symbol vector multiplied with $e^{j\theta}$, and $jy_k$ represents an imaginary term of $k^{th}$ symbol within the symbol vector multiplied with $e^{j\theta}$; and a space-time-frequency block code (STFBC) mapper for selecting an STFBC using a permutation matrix in which the following matrices A, B and C are arranged in a predetermined order, mapping the pre-coded symbols to the transmit antennas according to the selected STFBC, and transmitting the mapped symbols through the transmit antennas, $$A = \begin{bmatrix} s_1 & -s_2^* & 0 & 0 \\ s_2 & s_1^* & s_3 & -s_4^* \\ 0 & 0 & s_4 & s_3^* \end{bmatrix}$$

$$B = \begin{bmatrix} s_1 & -s_2^* & s_3 & -s_4^* \\ s_2 & s_1^* & 0 & 0 \\ 0 & 0 & s_4 & s_3^* \end{bmatrix}$$

-continued $$C = \begin{bmatrix} s_1 & -s_2^* & 0 & 0 \\ 0 & 0 & s_3 & -s_4^* \\ s_2 & s_1^* & s_4 & s_3^* \end{bmatrix}$$

where a row represents sysmbols for a corresponding antenna and a column represents symbols mapped with a subcarrier.

2. The transmitter of claim 1, wherein the STFBC mapper includes a mapper for mapping the pre-coded symbols to the transmit antennas according to the selected STFBC and transmitting the mapped symbols through the transmit antennas.

3. The transmitter of claim 1, wherein the permutation matrix is given by $A_k$:$k$=mod(floor((index of logical data subcarrier−1)/ 2), 3)+1 where $A_k(A_1=A, A_2=B, A_3=C)$ is an antenna grouping pattern for subcarriers, index of logical data subcarrier ranges from 1 to the total number of subcarriers.

4. The transmitter of claim 1, wherein the permutation matrix is $$D = \begin{bmatrix} s_1 & -s_2^* & 0 & 0 & s_5 & -s_6^* & s_7 & -s_8^* & s_9 & -s_{10}^* & 0 & 0 \\ s_2 & s_1^* & s_3 & -s_4^* & s_6 & s_5^* & 0 & 0 & 0 & 0 & s_{11} & -s_{12}^* \\ 0 & 0 & s_4 & s_3^* & 0 & 0 & s_8 & s_7^* & s_{10} & s_9^* & s_{12} & -s_{11}^* \end{bmatrix}$$

where a row represents symbols for a corresponding antenna and a column represents symbols mapped with a subcarrier.

5. The transmitter of claim 2, wherein the permutation matrix is $$D = \begin{bmatrix} s_1 & -s_2^* & 0 & 0 & s_5 & -s_6^* & s_7 & -s_8^* & s_9 & -s_{10}^* & 0 & 0 \\ s_2 & s_1^* & s_3 & -s_4^* & s_6 & s_5^* & 0 & 0 & 0 & 0 & s_{11} & -s_{12}^* \\ 0 & 0 & s_4 & s_3^* & 0 & 0 & s_8 & s_7^* & s_{10} & s_9^* & s_{12} & -s_{11}^* \end{bmatrix}$$

where a row represents symbols for a corresponding antenna and a column represents symbols mapped with a subcarrier.

6. A transmitter with three transmit antennas in a communication system using a space-time-frequency block coding scheme, the transmitter comprising:
a pre-coder for pre-coding a symbol vector of an input symbol sequence by multiplying the symbol vector by $e^{j\theta}$, $\theta$ being a phase rotation angle, reconstructing the symbol vector multiplied with $e^{j\theta}$ and outputting pre-coded symbols $c_1$, $c_2$, $c_3$, and $c_4$, given as, $c_1 = x_1 + jy_3$ $c_2 = x_2 + jy_4$ $c_3 = x_3 + jy_1$ $c_4 = x_4 + jy_2$ where $c_k$ represents a $k^{th}$ pre-coded symbol, $x_k$ represents a real term of $k^{th}$ symbol within the symbol vector multiplied with $e^{j\theta}$, and $jy_k$ represents an imaginary term of $k^{th}$ symbol within the symbol vector multiplied with $e^{j\theta}$; and a space-time-frequency block code (STFBC) mapper for selecting an STFBC using a permutation matrix calculated by $A_k$:$k$=mod(floor((index of logical data subcarrier−1)/ 2), 3)+1 mapping the pre-coded symbols to the transmit antennas according to the selected STFBC, and transmitting the mapped symbols through the transmit antennas, where $A_k(A_1=A, A_2=B, A_3=C)$ is an antenna grouping pattern for subcarriers, index of logical data subcarrier ranges from 1 to the total number of subcarriers, and the matrices A, B and C are $$A = \begin{bmatrix} s_1 & -s_2^* & 0 & 0 \\ s_2 & s_1^* & s_3 & -s_4^* \\ 0 & 0 & s_4 & s_3^* \end{bmatrix}$$

$$B = \begin{bmatrix} s_1 & -s_2^* & s_3 & -s_4^* \\ s_2 & s_1^* & 0 & 0 \\ 0 & 0 & s_4 & s_3^* \end{bmatrix}$$

$$C = \begin{bmatrix} s_1 & -s_2^* & 0 & 0 \\ 0 & 0 & s_3 & -s_4^* \\ s_2 & s_1^* & s_4 & s_3^* \end{bmatrix}$$

where a row represents symbols for corresponding antenna and a column represents symbols mapped with a subcarrier.

7. The transmitter of claim 6, wherein the STFBC mapper includes a mapper for mapping the pre-coded symbols to the transmit antennas according to the selected STFBC, and transmitting the mapped symbols through the transmit antennas.

8. The transmitter of claim 6, wherein the permutation matrix is $$D = \begin{bmatrix} s_1 & -s_2^* & 0 & 0 & s_5 & -s_6^* & s_7 & -s_8^* & s_9 & -s_{10}^* & 0 & 0 \\ s_2 & s_1^* & s_3 & -s_4^* & s_6 & s_5^* & 0 & 0 & 0 & 0 & s_{11} & -s_{12}^* \\ 0 & 0 & s_4 & s_3^* & 0 & 0 & s_8 & s_7^* & s_{10} & s_9^* & s_{12} & -s_{11}^* \end{bmatrix}$$

where a row represents symbols for a corresponding antenna and a column represents symbols mapped with a subcarrier.

9. The transmitter of claim 7, wherein the permutation matrix is $$D = \begin{bmatrix} s_1 & -s_2^* & 0 & 0 & s_5 & -s_6^* & s_7 & -s_8^* & s_9 & -s_{10}^* & 0 & 0 \\ s_2 & s_1^* & s_3 & -s_4^* & s_6 & s_5^* & 0 & 0 & 0 & 0 & s_{11} & -s_{12}^* \\ 0 & 0 & s_4 & s_3^* & 0 & 0 & s_8 & s_7^* & s_{10} & s_9^* & s_{12} & -s_{11}^* \end{bmatrix}$$

where a row represents symbols for a corresponding antenna and a column represents symbols mapped with a subcarrier.

10. A transmitter with three transmit antennas in a communication system using a space-time-frequency block coding scheme, the transmitter comprising:
a pre-coder for pre-coding a symbol vector of an input symbol sequence and outputting pre-coded symbols; and a space-time-frequency block code (STFBC) mapper for selecting an STFBC using a permutation matrix calculated by $$A_k : k = \mathrm{mod}(\mathrm{floor}((\text{index of logical data subcarrier}-1)/2), 3)+1$$

mapping the pre-coded symbols to the transmit antennas according to the selected STFBC, and transmitting the mapped symbols through the transmit antennas, where $A_k(A_1=A, A_2=B, A_3=C)$ is an antenna grouping pattern for subcarriers, index of logical data subcarrier ranges from 1 to the total number of subcarriers, and the matrices A, B and C are $$A = \begin{bmatrix} s_1 & -s_2^* & 0 & 0 \\ s_2 & s_1^* & s_3 & -s_4^* \\ 0 & 0 & s_4 & s_3^* \end{bmatrix}$$

$$B = \begin{bmatrix} s_1 & -s_2^* & s_3 & -s_4^* \\ s_2 & s_1^* & 0 & 0 \\ 0 & 0 & s_4 & s_3^* \end{bmatrix}$$

$$C = \begin{bmatrix} s_1 & -s_2^* & 0 & 0 \\ 0 & 0 & s_3 & -s_4^* \\ s_2 & s_1^* & s_4 & s_3^* \end{bmatrix}$$

where a row represents symbols for a corresponding antenna and a column represents symbols mapped with a subcarrier.

11. The transmitter of claim 10, wherein the STFBC mapper includes a mapper for mapping the pre-coded symbols to the transmit antennas according to the selected STFBC, and transmitting the mapped symbols through the transmit antennas.

12. The transmitter of claim 10, wherein the permutation matrix is $$D = \begin{bmatrix} s_1 & -s_2^* & 0 & 0 & s_5 & -s_6^* & s_7 & -s_8^* & s_9 & -s_{10}^* & 0 & 0 \\ s_2 & s_1^* & s_3 & -s_4^* & s_6 & s_5^* & 0 & 0 & 0 & 0 & s_{11} & -s_{12}^* \\ 0 & 0 & s_4 & s_3^* & 0 & 0 & s_8 & s_7^* & s_{10} & s_9^* & s_{12} & s_{11}^* \end{bmatrix}$$

where a row represents symbols for a corresponding antenna and a column represents symbols mapped with a subcarrier.

13. The transmitter of claim 11, wherein the permutation matrix is $$D = \begin{bmatrix} s_1 & -s_2^* & 0 & 0 & s_5 & -s_6^* & s_7 & -s_8^* & s_9 & -s_{10}^* & 0 & 0 \\ s_2 & s_1^* & s_3 & -s_4^* & s_6 & s_5^* & 0 & 0 & 0 & 0 & s_{11} & -s_{12}^* \\ 0 & 0 & s_4 & s_3^* & 0 & 0 & s_8 & s_7^* & s_{10} & s_9^* & s_{12} & s_{11}^* \end{bmatrix}$$

where a row represents symbols for a corresponding antenna and a column represents symbols mapped with a subcarrier.

14. A method of transmitting a space-time-frequency block code (STFBC) in a transmitter with three transmit antennas, the method comprising the steps of:

pre-coding a symbol vector of an input symbol sequence by multiplying the symbol vector by $e^{j\theta}$, $\theta$ being a phase rotation angle;

reconstructing the symbol vector multiplied with $e^{j\theta}$ and outputting pre-coded symbols $c_1, c_2, c_3$ and $c_4$ given as, $$c_1 = x_1 + jy_3$$
$$c_2 = x_2 + jy_4$$
$$c_3 = x_3 + jy_1$$
$$c_4 = x_4 + jy_2$$

where $c_k$ represents a $k^{th}$ pre-coded symbol, $x_k$ represents a real term of $k^{th}$ symbol within the symbol vector multiplied with $e^{j\theta}$, and $jy_k$ represents an imaginary term of $k^{th}$ symbol within the symbol vector multiplied with $e^{j\theta}$;

selecting an STFBC using a permutation matrix in which the following matrices A, B and C are arranged in a predetermined order;

mapping the pre-coded symbols to the transmit antennas according to the selected STFBC; and transmitting the mapped symbols through the transmit antennas, $$A = \begin{bmatrix} s_1 & -s_2^* & 0 & 0 \\ s_2 & s_1^* & s_3 & -s_4^* \\ 0 & 0 & s_4 & s_3^* \end{bmatrix}$$

$$B = \begin{bmatrix} s_1 & -s_2^* & s_3 & -s_4^* \\ s_2 & s_1^* & 0 & 0 \\ 0 & 0 & s_4 & s_3^* \end{bmatrix}$$

$$C = \begin{bmatrix} s_1 & -s_2^* & 0 & 0 \\ 0 & 0 & s_3 & -s_4^* \\ s_2 & s_1^* & s_4 & s_3^* \end{bmatrix}$$

where a row represents symbols for a corresponding antenna and a column represents symbols mapped with a subcarrier.

15. The method of claim 14, wherein the permutation matrix is given by $$A_k : k = \mathrm{mod}(\mathrm{floor}((\text{index of logical data subcarrier}-1)/2), 3)+1$$

where $A_k(A_1=A, A_2=B, A_3=C)$ is an antenna grouping pattern for subcarriers, index of logical data subcarrier ranges from 1 to the total number of subcarriers.

16. The method of claim 14, wherein the permutation matrix is $$D = \begin{bmatrix} s_1 & -s_2^* & 0 & 0 & s_5 & -s_6^* & s_7 & -s_8^* & s_9 & -s_{10}^* & 0 & 0 \\ s_2 & s_1^* & s_3 & -s_4^* & s_6 & s_5^* & 0 & 0 & 0 & 0 & s_{11} & -s_{12}^* \\ 0 & 0 & s_4 & s_3^* & 0 & 0 & s_8 & s_7^* & s_{10} & s_9^* & s_{12} & s_{11}^* \end{bmatrix}$$

where a row represents symbols for corresponding antenna and a column represents symbols mapped with a subcarrier.

17. A method of transmitting a space-time-frequency block code (STFBC) in a transmitter with three transmit antennas, the method comprising the steps of:

pre-coding a symbol vector of an input symbol sequence by multiplying the symbol vector by $e^{j\theta}$, $\theta$ being a phase rotation angle;

reconstructing the symbol vector multiplied with $e^{j\theta}$ and outputting pre-coded symbols $c_1, c_2, c_3$ and $c_4$ given as, $$c_1 = x_1 + jy_3$$
$$c_2 = x_2 + jy_4$$

$c_3 = x_3 + jy_1$ $c_4 = x_4 + jy_2$ where $c_k$ represents a $k^{th}$ pre-coded symbol, $x_k$ represents a real term of $k^{th}$ symbol within the symbol vector multiplied with $e^{j\theta}$, and $jy_k$ represents an imaginary term of $k^{th}$ symbol within the symbol vector multiplied with $e^{j\theta}$;

selecting an STFBC using a permutation matrix calculated;

$A_k:k=\text{mod}(\text{floor}((\text{index of logical data subcarrier}-1)/2), 3)+1$ mapping the pre-coded symbols to the transmit antennas according to the selected STFBC; and transmitting the mapped symbols through the transmit antennas, where $A_k(A_1=A, A_2=B, A_3=C)$ is an antenna grouping pattern for subcarriers, index of logical data subcarrier ranges from 1 to the total number of subcarriers, and the matrices A, B and C are $$A = \begin{bmatrix} s_1 & -s_2^* & 0 & 0 \\ s_2 & s_1^* & s_3 & -s_4^* \\ 0 & 0 & s_4 & s_3^* \end{bmatrix}$$

$$B = \begin{bmatrix} s_1 & -s_2^* & s_3 & -s_4^* \\ s_2 & s_1^* & 0 & 0 \\ 0 & 0 & s_4 & s_3^* \end{bmatrix}$$

$$C = \begin{bmatrix} s_1 & -s_2^* & 0 & 0 \\ 0 & 0 & s_3 & -s_4^* \\ s_2 & s_1^* & s_4 & s_3^* \end{bmatrix}$$

where a row represents symbols for a corresponding antenna and a column represents symbols mapped with a subcarrier.

18. The method of claim 17, wherein the permutation matrix is $$D = \begin{bmatrix} s_1 & -s_2^* & 0 & 0 & s_5 & -s_6^* & s_7 & -s_8^* & s_9 & -s_{10}^* & 0 & 0 \\ s_2 & s_1^* & s_3 & -s_4^* & s_6 & s_5^* & 0 & 0 & 0 & 0 & s_{11} & -s_{12}^* \\ 0 & 0 & s_4 & s_3^* & 0 & 0 & s_8 & s_7^* & s_{10} & s_9^* & s_{12} & s_{11}^* \end{bmatrix}$$

where a row represents symbols for corresponding antenna and a column represents symbols mapped with a subcarrier.

19. A method of transmitting a space-time-frequency block code (STFBC) in a transmitter with three transmit antennas, the method comprising the steps of:

pre-coding a symbol vector of an input symbol sequence and outputting pre-coded symbols;

selecting an STFBC using a permutation matrix calculated by;

$A_k:k=\text{mod}(\text{floor}((\text{index of logical data subcarrier}-1)/2), 3)+1$ mapping the pre-coded symbols to the transmit antennas according to the selected STFBC; and transmitting the mapped symbols through the transmit antennas, where $A_k(A_1=A, A_2=B, A_3=C)$ is an antenna grouping pattern for subcarriers, index of logical data subcarrier ranges from 1 to the total number of subcarriers, and the matrices A, B and C are $$A = \begin{bmatrix} s_1 & -s_2^* & 0 & 0 \\ s_2 & s_1^* & s_3 & -s_4^* \\ 0 & 0 & s_4 & s_3^* \end{bmatrix}$$

$$B = \begin{bmatrix} s_1 & -s_2^* & s_3 & -s_4^* \\ s_2 & s_1^* & 0 & 0 \\ 0 & 0 & s_4 & s_3^* \end{bmatrix}$$

$$C = \begin{bmatrix} s_1 & -s_2^* & 0 & 0 \\ 0 & 0 & s_3 & -s_4^* \\ s_2 & s_1^* & s_4 & s_3^* \end{bmatrix}$$

where a row represents symbols for a corresponding antenna and a column represents symbols mapped with a subcarrier.

20. The method of claim 19, wherein the permutation matrix is $$D = \begin{bmatrix} s_1 & -s_2^* & 0 & 0 & s_5 & -s_6^* & s_7 & -s_8^* & s_9 & -s_{10}^* & 0 & 0 \\ s_2 & s_1^* & s_3 & -s_4^* & s_6 & s_5^* & 0 & 0 & 0 & 0 & s_{11} & -s_{12}^* \\ 0 & 0 & s_4 & s_3^* & 0 & 0 & s_8 & s_7^* & s_{10} & s_9^* & s_{12} & s_{11}^* \end{bmatrix}$$

where a row represents symbols for a corresponding antenna and a column represents symbols mapped with a subcarrier.

* * * * *